United States Patent Office 3,790,441
Patented Feb. 5, 1974

3,790,441
BINDERS FOR GLASS FIBER INSULATION
Ronald James Ashall, Wigan, England, assignor to Fibreglass Limited, Liverpool, Lancashire, England
No Drawing. Filed Dec. 15, 1971, Ser. No. 208,396
Claims priority, application Great Britain, July 13, 1971, 32,877/71
Int. Cl. C08g 37/08; C08h 15/00
U.S. Cl. 161—198                                12 Claims

ABSTRACT OF THE DISCLOSURE

A binder composition for bonding together glass comprises a resin of a phenol-formaldehyde polymer, and urea and sodium lignosulfonate as binder setting modifying additives such that by varying the relative proportions of urea and sodium lignosulfonate added, a predetermined setting time can be achieved.

FIELD OF THE INVENTION

This invention concerns improvements in or relating to binders for glass fiber insulation, and to glass fiber products using such binders.

BACKGROUND OF THE INVENTION

In the production of glass fiber products, such as products used for insulation purposes, it is common practice to bond glass fibers with a binder during their formation into the product. In one particular process, glass fibers are sprayed with a binder as they fall through a hood onto a moving conveyor on which they form a mat. With such a process the setting time of the binder is an important factor. If the setting time is too short, the binder may become partially set before it has been compressed up to its final density. If, on the other hand, the setting time is too long, there is a tendency for the mat to contain "green patches," i.e. patches where the binder has not set satisfactorily.

One form of binder used is based on a phenol-formaldehyde resin which is normally mixed with a suitable extender, which should preferably help to improve the binding properties of the comosption. We have now found that by a suitable choice of the components forming the binder, we can control the gel or setting time of the binder. In addition, the binder composition of the invention is found to have a greater efficiency, that is the percentage of binder retained on the glass fibers after cure is increased. This is believed to be due to a reduction in the loss of low molecular weight material during application and cure of the binder. We have found that urea can be used to increase the setting time of the binder, and a material known as sodium lignosulphonate tends to shorten the setting time. The addition of urea to binder compositions for glass fibers has been described, but the combination of urea with sodium lignosulfonate provides a control over gel setting time previously unobtainable. The use of these relatively cheap extenders not only enables the setting time to be controlled, but the cost of the binder and the amount of phenol required in the binder to be reduced. The reduction in phenol content enables a binder to be used which enables the problem of removing phenol from the plant effluent to be diminished. It has previously been considered undesirable to have sodium present in the binder materials used for glass fibers as it is known that the presence of sodium has an adverse effect on the weathering properties of the product formed on spraying glass wool with a binder. We have found that provided the concentration of sodium in the sodium lignosulfonate material is less than a certain value there is no adverse effect on the weather properties probably due to the nature and amount of the sodium lignosulfonate used. Sodium lignosulfonate is obtainable in the form of a treated waste sulfite liquor, and can for example be a concentrated liquor with about 53% solids or a more dilute form with 7 to 15% solids. A spray dried solid is also available.

SUMMARY OF THE INVENTION

According to the invention, there is provided a binder composition for use with glass fibers which comprises a phenol-formaldehyde polymer, co-polymer or terpolymer as the resin in the binder, urea and a sodium lignosulfonate, the relative proportions of urea and sodium lignosulfonate being chosen so as to impart a desired setting time to the binder.

The invention further comprehends a glass fiber product comprising glass fibers coated with a binder set forth in this specification, and a method of producing such a product which includes coating glass fibers with such a binder.

The urea acts to lengthen the setting time of the resin, and the sodium lignosulfonate to shorten it.

The amount of urea used is preferably in the range 5% to 45% and the amount of lignosulfonate preferably 5 to 20%.

We have found it convenient to express the relationship between urea and sodium lignosulfonate in terms of a ratio which is the ratio of solids content due to the sodium lignosulfonate to the solids content due to the resin used in the binder and any additional urea.

This ratio preferably has a value from 0.15 to 0.260, and we refer to this as the banding solids content ratio.

This variation in ratio enables us to vary the phenol content of the binder. We find, for example, that when the ratio has a value of 0.19, the amount of phenol present is 34%, and at a value of 0.157, the amount of phenol is 47%. A solids content ratio value of 0.157 can e.g. be obtained using a resin at 15% solids content plus 5% by weight of urea and 15% by weight of the lignosulfonate. A solids content ratio as high as 0.260 would be obtained using the resin, plus 15% by weight urea, and 20% by weight of the lignosulfonate.

We have measured the pH values of solutions containing 10% solids of the various sodium lignosulfonate which can be employed as binder extenders and have found them to be as follows:

Sodium lignosulfonate (derived from 53% solids liquor) ------------------------------------------- 4.3
Sodium lignosulfonate (15% solids liquor) --------- 1.5
Sodium lignosulfonate (8% solids liquor) ---------- 7.5

It was surprising that a material containing sodium ions proved suitable for use, as the presence of sodium ions would be expected to decrease the weathering properties of the bonded glass wool products obtained. We have found that with a concentration of sodium ions of less than 20% (measured on 100% solids) in a sodium lignosulfonate that because of the nature and amount of lignosulfonate used the sodium ion has little or no effect on the weathering properties. We prefer to avoid the use of material having a pH approaching neutral or on the alkaline side of neutral as the weathering properties tend to become unsatisfactory with such materials. This is demonstrated by the results obtained using a binder containing bonding solids as follows: resin 74%, urea 10%, lignosulfonate 16% in a rod adhesion test.

This test is carried out as follows.

Binder glass adhesion

A 12% binder mix is first prepared. This is the standard mix for evaluation of resins.

The bushing is switched on and the drum is set rotating at 3000 r.p.m. The temperature of the bushing is allowed to rise to such an extent that the diameter of the fiber is equal to 0.004" (keeping the glass level in the bushing constant). The fiber is then drawn over a pad onto the drum, and each rod (3000 fibers) is run for 1 minute. The pad is kept moist by spooning the resin mix onto it. For each binder mix, 10 rods are run. The rods are taken off the drum, dipped in the binder mix and then left to drip for an hour. The rods are then cured in an oven at 220° C. for 5 minutes. They are then divided into two, one-half is reversed and then cut into two halves. One-half is tested to find the breaking strengths of the rods. 15 readings are taken, and the average is noted. The other half of the rods are put into a humidity cabinet for 1 hour. The temperature of the cabinet is 50° C. and a tray in the bottom of the cabinet contains a saturated solution of potassium sulfate. The breaking strength of these rods is then determined, again 15 readings are taken and the average is noted. The percent difference between the two breaking strengths is known as the percent weathering loss.

Comparative rod adhesion tests on various forms of sodium lignosulfonate waste liquor showed that the more concentrated material was the best source, but other sources could provide useable material, but that the material containing 27% Na ion (based on 100% solids) was inferior in performance to the other materials.

COMPARATIVE EVALUATION OF LIGNOSULFONATES

[Binder with 10% urea and 16% lignosulfonate]

| Type of lignosulfonate | Rod adhesion | | Na ion Percent loss concentration, percent on 100% solids | |
|---|---|---|---|---|
| | As made (grams) | After humidity (grams) | | |
| Sodium lignosulfonate: | | | | |
| (Source A) 53% solids | 411 | 373 | 9 | 9.4 |
| (Source B) 8% solids | 431 | 339 | 21 | 27.0 |
| (Source C) 7% solids | 427 | 393 | 8 | 12.8 |

Method of determining gel time used in the examples below

The gel time was determined using the following:

(1) A thermostatically controlled hot plate set at 150° C. (310° F.).
(2) A surgical syringe capable of dispensing 2 cc. of binder at 15% solids concentration.
(3) A wooden handled spatula tapering to ¼" at the tip.
(4) A stop watch.

Before making tests, resins and binders are adjusted to pH 6. A 2 cc. sample of binder is run to the center of the hot plate from the syringe. The stop watch is started immediately the sample contacts the hot plate. The binder is held in the center of the hot plate by using the spatula. After the bulk of the diluent water has evaporated, the spatula is moved in an up and down motion using the flat tip of the spatula in contact with the heated residue. The gel time is when the residue commences to string. The time is noted by the stop watch, and three tests are run for each resin, the average being the gel time.

EXAMPLE 1

This example in addition to illustrating a binder composition according to the invention, also illustrated the method used in calculating the solids content ratio.

A co-polymer resin for use in a binder according to the invention was prepared as follows using the following mole ratio of reactants:

1 mol phenol:2.7 mols formaldehyde:1 mol urea:0.005 mol Carbowax 600 (a Union Carbide Co. trade name for a polyethyleneglycol): 0.045 mol barium hydroxide.

In making up a batch of resin, the following quantities of reactants were used:

| | | |
|---|---|---|
| Phenol | gallons | 230 |
| Formaldehyde, 37% w./w. | do | 500 |
| Urea | lbs | 1530 |
| Polyethylene glycol (Carbowax 600) | lbs | 78 |
| Barium hydroxide pentahydrate | lbs | 300 |
| Sulfuric acid, specific gravity 1.25 | gallons | 22 |

The reaction cycle is as follows.

The catalyst is added to the phenol formaldehyde mixture. The reaction proceeds at 115° F., pH 8.5 to 9 for two hours. The temperature is raised to 145° F. for two hours. The polyethylene glycol is added. The temperature is raised to 165° F. and held for one to one and a quarter hours. The urea is added over a quarter hour period and reacted at 165° F. for a further thirty minutes. The resin is cooled to 100° F. and neutralized to pH 7.2 with sulfuric acid.

This resin can be used in making up binder formulations while varying the solids content ratio in the range 0.150 to 0.260.

A binder solution was made up of using the following quantities of ingredients and as resin material prepared as described above.

| | A | B | C |
|---|---|---|---|
| | | Solids, lbs. | Bulk, lbs. |
| Co-polymer resin (prepared as above, specific gravity 1.19 and 48% solids) | 45 gals | 260 | 540 |
| Ammonia solution, specific gravity 0.88 | 3 gals | | 26 |
| Ammonium sulfate solution, 16.7% w./w. | 1 gal | 1.67 | 10 |
| A1120 silane additive | 5 oz | 0.31 | 0.31 |
| Kiton orange dye | 1 lb | 1.0 | 1.0 |
| Sodium lignosulfonate liquor, 53% solids | 100 lbs | 53.0 | 100 |
| Urea | 35 lbs | 35 | 35 |
| Emulsified oil, specific gravity 0.9 40% w./w. | 10 gals | 36 | 90 |
| Make up water | 210 gals | | |

Column A represents the quantity of material used, column B the solids content in lbs., and column C the bulk content in lbs. Column B gives a total effective solids of 384 lbs. (i.e. excluding ammonium sulfate, silane and dye) and column C 2902 lbs. (including the water). The total bonding solids content can then be calculated neglecting the emulsified oil content of 35 lbs. (subtracted from 384 as it does not take part in bonding).

Percent total bonding solids content $$=\frac{384-36}{2902}\times 100=12\%$$

$$\text{Urea extender content}=\frac{35}{384-36}\times 100=10\%$$

$$\text{Sodium lignosulfonate content}=\frac{53}{384-36}\times 100=15\%$$

To calculate the bonding solids content ratio of sodium lignosulfonate to phenol, formaldehyde and urea, the inert material formed from the catalyst is neglected as it does not enter into the bonding action. In the present example, 260 lbs. of resin will contain 15 lbs. barium sulphate, so we determine the bonding solids content ratio in the following manner:

Bonding solids content ratio $$=\frac{53 \text{ (due to sodium lignosulphonate)}}{260 \text{ (resin)} -15 \text{ (catalyst)} +35 \text{ (urea)}}$$

$$=\frac{53}{280}=0.19$$

The bonding solids content ratio of sodium lignosulfonate to phenol, formaldehyde and urea is 0.19. This binder gave a gel time of 167 seconds, the gel time being measured by the hot plate test described below.

EXAMPLE 2

The effect on gel time of varying the amounts of urea and sodium lignosulfonate (the source being a 53% solids liquor) in a binder composition, containing as the resin component, a co-polymer prepared as in Example 1 was investigated. The binder was made so as to have a 15% solids content, and the bonding solids content ratio varied between 0.058 and 0.260, but we prefer to operate with the bonding solids ratio in the range 0.15 to 0.260.

The results obtained are given in Table 1, and show that the addition of urea extends the gel or setting time of the binder and the addition of sodium lignosulfonate shortens the gel time. It is thus possible by blending different proportions of urea and sodium lignosulfonate to adjust the gel time between quite wide but definite limits. The times given in the table are in seconds, the percentages represent percentages by weight based on 100% as the weight of bonding solids i.e. where urea is e.g. 5% and lignosulfonate 20%, the resin content of the bonding solids will be 75%.

TABLE 1

| Lignosulfonate, percent | 0 | 5 | 10 | 15 | 20 |
|---|---|---|---|---|---|
| Urea, percent: | | | | | |
| 0 | 174 | 164 | 141 | 129 | 111 |
| 5 | | 178 | 155 | 140 | 125 |
| 10 | | 191 | 170 | 153 | 146 |
| 15 | | 216 | 195 | 177 | 155 |

What is claimed is:

1. A binder composition for use on glass wool products which comprises:
   (1) a phenol-formaldehyde polymer produced in the presence of barium hydroxide as a condensing agent as resin in the binder,
   (2) urea as a binder setting modifying additive, and
   (3) sodium lignosulfonate as an additional binder setting modifying additive, the relative proportions of urea and sodium lignosulfonate being chosen so as to obtain a desired setting time.

2. A binder composition as claimed in claim 1 characterized in that the bonding solids content ratio as hereinbefore defined is in the range 0.15 to 0.260.

3. A binder composition as claimed in claim 1 characterized in that the sodium lignosulfonate used contains 20% or less of sodium ions (based on 100% solids).

4. A binder composition as claimed in claim 1 characterized in that the resin is a phenol-formaldehyde-urea polymer.

5. A binder composition as claimed in claim 4 characterized in that the mol ratio of the reactants used in forming the resin is about
   1 mol phenol:2.7 mols formaldehyde:1 mol urea:0.045 mol barium hydroxide being present as a catalyst.

6. A binder composition as claimed in claim 4 characterized in that the mol ratio of the reactants used in forming the resin is
   1 mol phenol:2.5 mols formaldehyde:1 mol urea:0.045 mol barium hydroxide being present as a catalyst.

7. A binder composition as claimed in claim 1 in which the resin used in the binder is a phenol-formaldehyde urea-dicyandiamide polymer.

8. A binder composition as claimed in claim 7 in which the mol ratio of the reactants used in forming the resin is
   1 mol phenol:3.1 mols formaldehyde:0.11 mol dicyandiamide:0.23 mol urea:0.068 mol of barium hydroxide being present as a catalyst.

9. A binder composition as claimed in claim 8 in which the bonding solids content ratio is 0.19.

10. A binder composition as claimed in claim 1 in which a polyethylene glycol is added during the manufacture of the resin.

11. A bonded product formed from glass fibers and a heat curable binder in which the binder used is as claimed in claim 1.

12. A method of treating glass fibers in which a binder composition as claimed in claim 1 is applied to glass fibers to form a bonded product.

References Cited
UNITED STATES PATENTS

| | | | |
|---|---|---|---|
| 2,786,008 | 3/1957 | Herschler | 154—132 |
| 3,090,700 | 5/1963 | Ball et al. | 117—66 |
| 3,095,392 | 6/1963 | Herrick | 260—17.5 |
| 3,285,801 | 11/1966 | Sarjeant | 161—170 |
| 3,336,185 | 8/1967 | Helbing | 161—170 |

WILLIAM H. SHORT, Primary Examiner

E. A. NIELSEN, Assistant Examiner

U.S. Cl. X.R.

156—335; 161—170, Digest 4; 260—17.5